(12) United States Patent
Jiang et al.

(10) Patent No.: US 7,787,506 B1
(45) Date of Patent: Aug. 31, 2010

(54) GAIN-SWITCHED FIBER LASER SYSTEM

(75) Inventors: Min Jiang, Acton, MA (US); Daniel Mahgerefteh, Somerville, MA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/493,140

(22) Filed: Jul. 26, 2006

Related U.S. Application Data

(60) Provisional application No. 60/702,492, filed on Jul. 26, 2005.

(51) Int. Cl.
*H01S 3/13* (2006.01)
*H01S 3/30* (2006.01)
*H01S 3/10* (2006.01)
*H01S 3/091* (2006.01)

(52) U.S. Cl. .............................. 372/30; 372/6; 372/25; 372/29.02; 372/70

(58) Field of Classification Search ....................... None
See application file for complete search history.

(56) References Cited

U.S. PATENT DOCUMENTS 4,330,763 A     5/1982   Esterowitz et al.
4,995,046 A  *  2/1991   Fan et al. ...................... 372/41
5,867,305 A  *  2/1999   Waarts et al. ................... 372/6
5,991,068 A  * 11/1999   Massicott et al. ............... 372/6
6,034,975 A     3/2000   Harter et al.
6,064,682 A  *  5/2000   Vickers ........................ 372/25
6,137,813 A    10/2000   Ionov et al.
6,252,892 B1    6/2001   Jiang et al.
6,721,092 B2    4/2004   Aozasa et al.
6,804,270 B1   10/2004   Vakhshoori et al.

FOREIGN PATENT DOCUMENTS

WO     WO 2004/013980     2/2004

OTHER PUBLICATIONS

Stuart D. Jackson et al., "Efficient Gain-Switched Operation of a Tm-Doped Silica Fiber Laser", IEEE Journal of Quantum Electronics, May 1998, 779-789, vol. 34, No. 5.

(Continued)

*Primary Examiner*—Minsun Harvey
*Assistant Examiner*—Sean Hagan
(74) *Attorney, Agent, or Firm*—Morrison & Foerster LLP

(57) ABSTRACT

This invention discloses a method to control laser dynamics in a gain-switched fiber laser so as to generate stable, clean pulses in an all-fiber format. The gain-switched fiber laser is suitable as a standalone laser source, and as a pump source for harmonic generation and an optical-parametric-oscillator.

3 Claims, 4 Drawing Sheets

OTHER PUBLICATIONS

M. Jiang et al., "Stable 10 ns, kilowatt peak-power pulse generation
B. C. Dickinson et al., "10 mJ total output from a gain-switched Tm-doped fibre laser", Optics Communications, Aug. 1, 2000, 199-203, No. 182.

Yun-Jun Zhang et al., "Gain-switched Tm3+-doped double clad silica fiber laser", Optics Express, Feb. 21, 2005, 1085-1089, vol. 13, No. 4.

B.C. Dickinson et al., "10 mJ total output from a gain-switched Tm-doped fibre laser," *Optics Communications*, vol. 182, Aug. 1, 2000, pp. 199-203.

S.D. Jackson et al., "Efficient Gain-Switched Operation of a Tm-Doped Silica Fiber Laser," *IEEE Journal of Quantum Electronics*, vol. 34, No. 5, May 1998, pp. 779-789. from a gain-switched Tm-doped fiber laser," *Optics Letters*, vol. 32, No. 13, Jul. 1, 2007, pp. 1797-1799.

L.A. Zenteno et al., "Gain switching of a $Nd^{+3}$-doped fiber laser," *Optics Letters*, vol. 14, No. 13, Jul. 1, 1989, pp. 671-673.

Y-J. Zhang et al., "Gain-switched $Tm^{3+}$-doped double-clad silica fiber laser," *Optics Express*, vol. 13, No. 4, Feb. 21, 2005, pp. 1085-1089.

* cited by examiner

GAIN-SWITCHED FIBER LASER SYSTEM

REFERENCE TO PENDING PRIOR PATENT APPLICATION

This patent application claims benefit of pending prior U.S. Provisional Patent Application Ser. No. 60/702,492, filed Jul. 26, 2005 by Min Jiang for DOUBLE MODULATED FIBER MOPA, GAIN-SWITCHED MID-IR FIBER LASER WITH FLEXIBLE WAVEFORM, which patent application is hereby incorporated herein by reference.

FIELD OF THE INVENTION

This invention relates to pulsed fiber lasers in general, and more particularly to in-line pulse generation achieved through gain-switching.

BACKGROUND OF THE INVENTION

Fiber lasers have the significant advantages of high efficiency, easy thermal management and inherent robustness. With recent advances in high quality, double-clad fibers, fiber lasers have been demonstrated to achieve power conversion efficiencies of over 90%, and power levels approaching 1 kW in continuous wave (cw) operation. For pulsed operation, however, fiber lasers often need free-space devices (such as acousto-optical or electro-optical switches) to initiate and maintain stable operation. However, the use of such free-space devices generally diminishes the inherent advantages of the confined structured optical fiber, and typically leads to problems in system complexity and reliability.

A gain-switched fiber laser generally has the following advantages:

(i) All-fiber, in-line pulse generation—no free-space optics are required.

(ii) Flexible repetition rate—gain-switched fiber lasers can produce a stable pulse train at any modulation rate up to the relaxation oscillation frequency, which is typically in the range of MHz.

(iii) Wide range of pulse widths are possible, from ns to µs—the pulse width of gain-switched lasers depends on gain and the "cavity lifetime", which can be varied over a wide range in fiber lasers.

Gain-switching is a pulse generation method which generates pulsed output by varying the gain of a laser cavity. In fiber lasers, the gain-switching is achieved within the gain fiber, which typically comprises an optical fiber doped with a rare-earth element which serve as active ions, which makes it possible to achieve a potentially in-line pulse generation.

However, the challenge of generating a stable pulse chain in gain-switched fiber lasers lies in the control of the relaxation oscillation, which typically results in chaotic pulsation.

In principle, laser dynamics can be described by using rate equations for population inversion, N(t), and the cavity photon number P(t):

$$dN(t)/dt = R(t) - N(t)/\tau_E - K \cdot N(t) \cdot P(t) \quad (1)$$

$$dP(t)/dt = K \cdot N(t) - P(t) - P(t)/\tau_P + K \cdot N(t) \cdot P_{ASE} \quad (2)$$

where R(t) is the effective pump rate for population buildup of N(t), K is the coupling coefficient, $P_{ASE}$ are the spontaneous emission photons coupled into the laser mode, $\tau_E$ is the excitation lifetime and $\tau_C$ is the cavity (photon) lifetime. The cavity lifetime $\tau_C = T_C/\delta_C$ is determined by the cavity roundtrip time $T_C$ and cavity loss $\delta_C$. For fiber lasers which typically have a large output coupling, the cavity lifetime is essentially the same as the cavity roundtrip time, namely, $\tau_C \approx T_C = L/2C$, with L being the effective cavity length and C the speed of light.

Under continuous wave (cw) operation, the laser output has a relatively stable amplitude, except for the short time interval when the pump source is first turned on. For this short time interval, the excitation population builds up initially according to Eqs. 1 and 2, to a level near the lasing threshold ($N_{th} = 1/K\tau_C$) and the photon numbers begin to grow exponentially. The growth rate of the photons is essentially given by ($K \cdot N(t) - 1/\tau_C$), which grows larger as the N(t) increases with continuous pumping. As the growth rate of the photons exceeds the pumping rate, the excitation population eventually decreases below the lasing threshold and the lasing stops. This photon buildup and lasing action is repeated until the laser operation reaches a steady state with constant laser output (dP/dt=0), when the excitation population supplied by the pump is equal to that consumed by the photons. The oscillation buildup time ($\tau_B$), the period ($\omega_{Re}$) and amplitude damping rate ($\gamma_{Re}$) of the relaxation oscillation can be approximated as:

$$\tau_B = C_S \cdot \tau_C/(\gamma - 1) \quad (3)$$

$$\omega_{Re} = [(\gamma - 1)/\tau_E \tau_C]^{0.5} \quad (4)$$

$$\gamma_{Re} = \gamma/2\tau_E \quad (5)$$

where $\gamma = R\tau_E/N_{th}$ is the inversion ratio, and $C_S \approx 20\text{-}30$ is a constant for a given laser representing the log ratio of the steady-state light intensity and that at initial noise level. The buildup time, relaxation oscillation period and damping rate all depend on the pumping rate, the cavity lifetime and the lifetime of the excited state.

Under gain-switched operation, using a modulated pump with a sufficiently large amplitude contrast and time period, the multi-peak relaxation oscillation pattern may be repeated following each pump pulse. The laser buildup, oscillation period and amplitude damping are, in principle, similar as that in Eqs. 3-5, with the population inversion ratio adjusted according to the effective pump rate R(t). The effective pumping rate in a typical laser system, however, is a function of the modulation pattern of the pump laser and, more importantly, a function of the relaxation dynamics from the pump absorption energy level ($E_P = hc/\lambda_P$) to the meta-stable energy level $E_S = hc/\lambda_S$ where the excitation population N(t) is accumulated. The relaxation oscillation pattern may vary significantly depending on the energy levels and time scales involved in the excitation population buildup process.

Relaxation oscillation is a characteristic of most solid state lasers in which the recovery time of the excited state population is substantially longer than the laser cavity decay time. The phenomenon was observed as early as the first generation of ruby lasers. Because of the long lifetime of the gain medium, relaxation oscillation is particularly severe in fiber lasers. Chaotic pulsation has been commonly observed. For example, in a gain-switched thulium-doped fiber laser pumped by a Ti:Sapphire laser at 790 nm, the output pulse train is somewhat periodic but the pulse width and frequencies are different than those of the pump pulses: the pulse width is ~0.3 µs and separated by 1 µs for the thulium-doped fiber laser (TDFL) output while the pump pulses are separated by 0.67 µs. Moreover, the laser dynamics in fiber lasers can be particularly complicated when the laser dynamics involve more than the typical 3-level or 4-level laser system. One outstanding example is the excited state absorption in thulium-doped fiber lasers. When the pump wavelength is near 1 µm, the absorption cross-sections of the excited states are on the same order as the ground state absorption. The decay time of the excited state absorption upper energy level is also on the same order as the laser population. Under this condition, the spiking phenomenon in a thulium-doped fiber laser becomes totally chaotic.

SUMMARY OF THE INVENTION

As a result, one object of the invention is to provide amplitude-stable, regular repetition rate and short duration pulses from fiber lasers through gain-switching within the gain fiber. A significant advantage of this method is the provision of an all-fiber pulse laser source which is simple, reliable, compact and maintenance-free even in harsh environments.

A further object of the invention is to extend the gain-switched fiber laser for high efficiency wavelength conversion through nonlinear optical effects.

These and other objects of the invention are achieved by providing a gain-switched fiber laser comprising a gain fiber laser and cavity optics, a modulated pump laser, and means for coupling the pump laser into the gain fiber and for switching the gain of the fiber laser.

This invention describes a method for gain-switching a fiber laser so as to provide pulses with stable amplitude and regular repetition and duration. This is to be contrasted with the prior art, in which a gain-switched fiber laser produces pulses with fluctuating amplitude and irregular or chaotic repetition and pulse duration. The invention described in this disclosure is exemplified by thulium-doped fiber lasers, which are widely considered to be among the most significant candidates for the gain-switched fiber laser technology. These thulium doped fiber lasers have emission spectra between the 1.8-2.2 µm spectral region. Gain-switched thulium doped fiber laser with stable and clean short pulse output could enable a wide range of applications such as remote sensing, mid-infrared spectroscopy, and optical countermeasures for missile defense. The gain-switching fiber laser technology of the present invention, however, is also readily applicable to other fiber lasers, such as Ytterbium (Yb), Erbium (Er), Neodymium (Nd) and Praseodymium (Pr) doped fiber lasers.

In one form of the present invention, there is provided a gain-switched fiber laser system for producing a short duration, amplitude stable, and regulated pulse period, comprising:

a fiber laser comprising a gain fiber in a cavity, and an output coupling; and an optical pump providing regulating pulses for driving the fiber laser, the regulating pulses having an intensity, duration, and wavelength such that the excitation population generated by the pump is depleted to a level below the lasing threshold in a time duration less than the relaxation oscillation period of the fiber laser.

In another form of the present invention, there is provided a high efficiency optical pulse generator comprising:

a gain switched fiber laser system for producing a short duration, amplitude stable, and regulated pulse period comprising:

a fiber laser comprising a gain fiber in a cavity, and an output coupling; and an optical pump providing regulating pulses for driving the fiber laser, the regulating pulses having an intensity, duration, and wavelength such that the excitation population generated by the pump is depleted to a level below the lasing threshold in a time duration less than the relaxation oscillation period of the fiber laser; and a nonlinear optical crystal for receiving the output of the fiber laser and converting the output of the fiber laser to a different wavelength.

In another form of the present invention, there is provided a method for producing a short duration, amplitude stable, and regulated pulse period, comprising:

providing a fiber laser and an optical pump for driving the fiber laser; and operating the optical pump so as to generate regulating pulses, the regulating pulses having an intensity, duration, and wavelength such that the excitation population generated by the optical pump is depleted to a level below the lasing threshold in a time duration less than the relaxation oscillation period of the fiber laser.

Other features and advantages of the invention will be made clear by the following detailed description, which is to be considered with the corresponding drawings.

BRIEF DESCRIPTION OF THE DRAWINGS

In the drawings, like components are identified by like numbers.

DETAILED DESCRIPTION OF THE INVENTION

A primary aspect of the present invention is the proper choice of the effective pump rate so as to establish a desired population buildup at a selected energy level. The effective pump rate should be chosen such that the accumulated excitation population is depleted to, and maintained at, a level below the lasing threshold in a time duration less than the relaxation oscillation period of the fiber laser so as to ensure the suppression of secondary pulses. This desired manner of operation is achieved by properly selecting the wavelength and the modulation characteristics of the pump laser.

Fiber lasers can generally be pumped by a number of absorption bands. One preferable choice for the pump wavelength $\lambda_P$ is to be "resonant" with the lasing wavelength $\lambda_S$. This is particularly feasible for fiber lasers which have broad and overlapping absorption and emission bands. Under this condition, the pump rate for excitation buildup at $\lambda_S$ is essentially the same as the pump modulation at $\lambda_P$. The gain of the fiber laser can then be accurately established and time-controlled (i.e., so as to create consistent, well-defined pulses) directly through the modulation of the pump pulse.

With the selected pump rate, relaxation oscillation is determined by the cavity parameters as described by Eqs. 3-5. In fiber lasers, these parameters can be adjusted over a wide range so as to achieve regular stable pulses with various parameters such as pulse width, repetition rate, and power level.

Figure 1A:
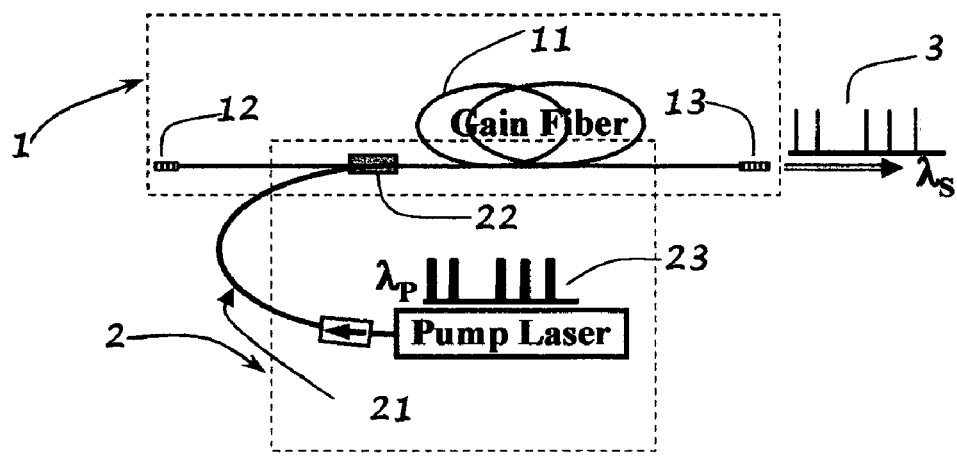
FIG. 1A illustrates a gain-switched fiber laser in a preferred embodiment of the invention.
Figure 1B:
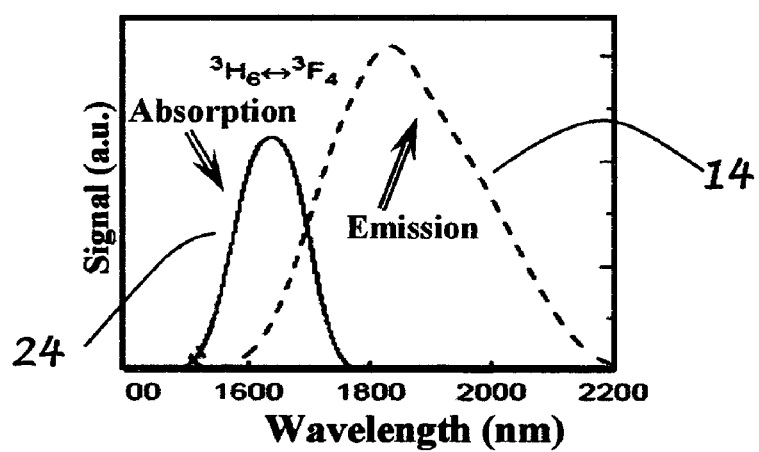
FIG. 1B illustrates the absorption and emission spectrum of a thulium-doped fiber laser.

FIGS. 1A and 1B illustrate a gain-switched fiber laser 1 which emits light at wavelength $\lambda_S$, and a pump laser 2 which emits light at wavelength $\lambda_P$. The output of the pump laser 2 is coupled into an optical fiber 21 which directs the pump beam into the rare-earth doped gain fiber 11 through a power coupler 22. Partially-reflective cavity mirrors 12, 13 are added at the ends of the fiber so as to form a laser cavity. Alternatively, optical fiber 21 may be configured in other ways well known in the art so as to form a laser cavity, e.g., optical fiber 21 can be looped back on itself. The pump laser 2 (emitting light at wavelength $\lambda_P$) is preferably operated in pulsed mode at repetition frequency $f_P$, and with pulse width $\tau_P$, as determined in accordance with the present invention.

Looking next at FIGS. 1A and 1B, operation of the laser system is as follows. The pump laser 2 is modulated, with the amplitude and the temporal waveform controlled by an electric current driver. The pump laser pulses at wavelength $\lambda_P$, within the absorption band 24, and is injected into the gain fiber 11 and is absorbed by the doping ions. The excited ions are quickly relaxed to an energy level at the corresponding laser wavelength $\lambda_S$ in the emission band 14. The excitation population of excited states is proportional to the total energy of the pump pulse. The photons of spontaneous emission at wavelength $\lambda_S$ propagate along the gain fiber 11 and are amplified according to Eq. 2; this in turn consumes the population of the excited states. With sufficiently high population inversion, laser emission at $\lambda_S$ is produced when the roundtrip gain exceeds the cavity loss.

Figure 2A:
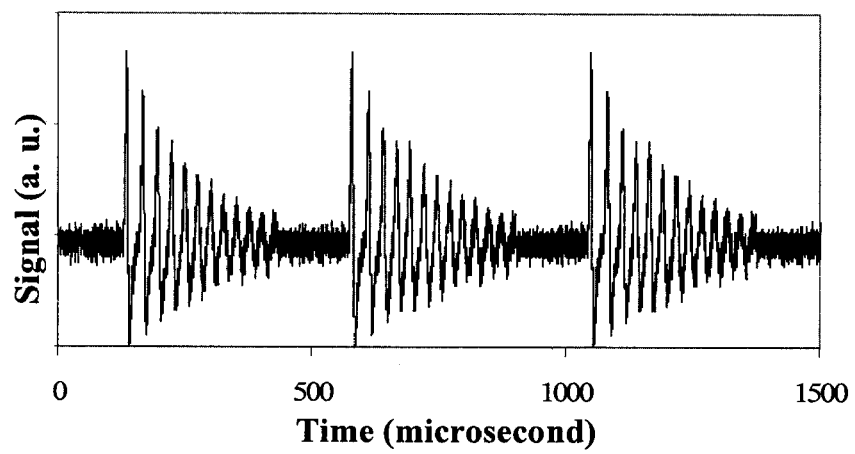
FIG. 2A illustrates a gain-switched fiber laser in the multi-pulsing operation.
Figure 2B:
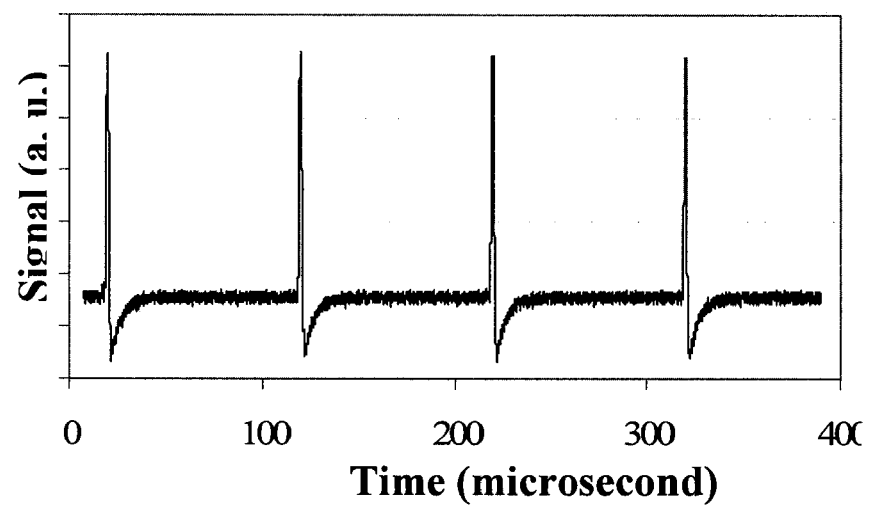
FIG. 2B illustrates a gain-switched fiber laser in the single pulsing operation of the present invention.

With the condition that the relaxation from energy level $\lambda_P$ to energy level $\lambda_S$ is essentially "instantaneous", the output of the laser emission at $\lambda_S$ depends on the duration and amplitude of the pump pulse and the fiber laser cavity lifetime. With an arbitrarily broad pump pulse, the fiber laser output at wavelength $\lambda_S$ shows relaxation oscillation, with multiple pulses of damping amplitude over time, as shown in FIG. 2A. The fiber laser output pulsing can also be irregular or chaotic in time. This multiple pulsing is an undesirable feature of fiber lasers in the prior art.

To generate single, short pulses with stable amplitude from the fiber laser, the excitation population has to be significantly depleted through the first cycle of relaxation oscillation of the laser. This condition can be fulfilled by using a properly modulated pump with appropriate large pulse energy and appropriate short duration. The pulse energy should be large enough to generate a sufficient excitation population to ensure laser action. The duration of the pump pulse should be sufficiently short such that the excitation population buildup essentially ceases when the fiber laser output pulse is generated.

The parameters on the appropriate pump rate (i.e., a pump rate which will create a fiber laser output having single, short pulses with stable amplitude) is a function of the cavity design of the fiber laser. This is shown in Eqs. 3-5. It should be appreciated that the population inversion ratio and the cavity lifetime are two most important parameters in determining the pulse dynamics in a gain-switched laser. The population inversion ratio is inversely proportional to the laser threshold, which is primarily determined by the output coupling in a fiber laser. The cavity lifetime is primarily determined by the cavity roundtrip time, which is easy to vary by increasing or decreasing fiber length. Due to the confined waveguide design, fiber lasers can have a very high gain, e.g. 20 dB, when sufficient pump power is provided. This high cavity gain allows substantial flexibility in setting the output coupling, thereby allowing easy optimization of the population inversion ratio for optimum gain-switching operation.

For pulsed lasers, pulse generation with the shortest possible pulse width is often of most interest. Under the condition that the population inversion is built up under fast pumping, the pulse width of the gain-switched fiber laser ($\tau_{GS}$) is essentially determined by the number of roundtrips needed to consume all the generated excitation population. For gain-switched fiber lasers, the high cavity gain allows fast photon density buildup, and hence large excitation population consumption within relatively few roundtrips, which is a condition necessary for short pulse generation. The pulse width of the gain-switched fiber laser decreases with increasing pump level as the population buildup and depletion is sped up. Using Eq. 3, the pulse width of the gain-switched fiber laser can be estimated to be 10-100 times of the cavity roundtrip time. With large pump energies, pulse widths as short as 10 ns may be generated from a gain-switched fiber laser with cavity length of 10 cm. For such fiber lasers, the gain fiber is preferably of a high doping level, and the pump laser is injected into the doped core to achieve effective pump absorption.

Various forms of gain fiber may be used in this invention. The gain fiber may be single clad with various core sizes and doping levels, or the gain fiber may be double clad with various core sizes and doping level. The non-doped, clad pump fiber may be of various sizes. Using single clad gain fiber, the pump pulse is injected directly into the doped core and the absorption is high. A short length of gain fiber, e.g. 10 cm, is needed to build a gain-switched fiber laser capable of generating <10 ns pulses. Double clad gain fiber has the advantage of allowing effective coupling of high-power, multi-mode pump lasers, such as broad-area diode lasers or multi-mode solidstate lasers. High power output can be generated from a gain-switched fiber laser. The cavity length of double clad fiber lasers, however, is generally relatively long (e.g., a few meters) leading to a relatively long pulse width (e.g., on the order of a μs).

A gain-switched fiber laser constructed in accordance with the present invention preferably further comprises optical feedback means and output coupling means to form a laser cavity and to couple the output of the fiber laser. The optical feedback means and the output coupling means may be of various forms such as fiber Bragg gratings, dielectric or metallic-coated reflectors, fiber reflectors, or any combination of these.

The pump laser for the gain-switched fiber laser may be of various forms. The pump laser may be a semiconductor laser, solid-state laser, fiber laser, or a fiber or solid-state amplifier seeded with a pulsed oscillator. The pump laser is preferably coupled into an optical fiber which is compatible with the geometry of the gain fiber. For short pulse generation from the gain-witched fiber laser, the pump laser pulse is preferably of short duration and high amplitude.

The pump coupler 22 in FIG. 1A directs the pump laser into the gain fiber. The pump coupler may be of various forms, based on fiber or dichroic reflector/transmitter, single mode or multi-mode, depending on the geometry of the gain fiber.

The laser cavity geometry may be linear, ring-shaped, sigma-shaped or other configuration that will be obvious to those skilled in the art of fiber lasers.

It should be appreciated that the gain-switched fiber laser of the present invention may be used as a standalone laser source, or as a seed oscillator for a laser amplifier, or for other uses which will be obvious to those skilled in the art in view of the present disclosure.

A further important application for the gain-switched fiber laser of the present invention is for high-efficiency wavelength conversion to generate fiber-delivered laser sources at wavelengths not directly attainable from fiber lasers.

Figure 3:
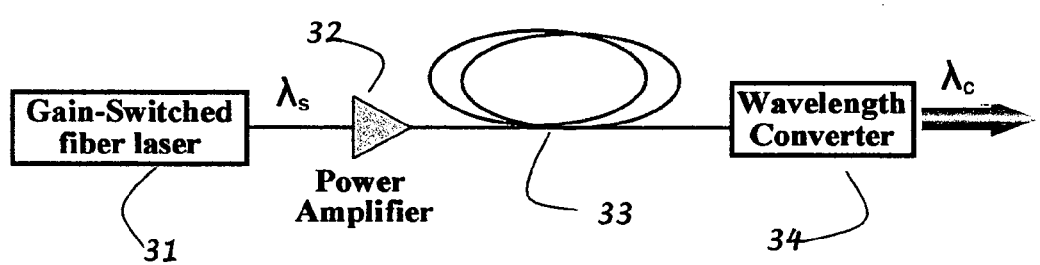
FIG. 3 illustrates another preferred embodiment wherein a wavelength converter is pumped by a gain-switched fiber laser.

Referring now to FIG. 3, there is shown a gain-switched fiber laser 31. Gain-switched fiber laser 31 comprises the gain fiber 1 and pump laser 2, etc. of FIG. 1A, with the pump laser being pulsed at appropriate large pulse energy and appropriate short duration so as to produce single, short pulses with stable amplitude at wavelength $\lambda_S$. The pulse output from gain-switched fiber laser 31 is directed into an optical fiber 33 and then is directed into the wavelength converter 34 so as to generate laser emission at wavelength $\lambda_C$. The wavelength converter 34 preferably comprises any focusing optics needed to direct the laser output into a nonlinear optical crystal. The wavelength converter 34 preferably comprises a nonlinear laser crystal such as PPLIN, KDP, KTP, BBO, ZGP, etc.

A fiber power amplifier 32 may be inserted between the gain-switched fiber laser 31 and the wavelength converter 34 so as to increase the power level of the laser pulse.

The wavelength converter 34 may be a second-harmonic generator which generates laser emission with wavelength $\lambda_S = \lambda_{GS}/2$. An important application for this embodiment is a gain-switched ytterbium-doped fiber laser producing laser pulse at a wavelength near 1.06 micrometer, with the second harmonic generation at wavelength 530 nm, which effectively produces a high power, fiber-based green laser.

The wavelength converter 34 may be an optical-parametric-oscillator receiving the signal laser beam at wavelength $\lambda_S$, and an idler beam at wavelength $\lambda_{ID}$ correlated with $1/\lambda_S + 1/\lambda_{id} = \lambda_{GS}$. An important application for this embodiment is a gain-switched thulium-doped fiber laser generating laser pulses at a wavelength near 2 micrometers. The signal and idler wavelengths may be in the 2-10 micrometer region, providing a fiber-based mid-infrared laser source.

An important application for fiber-based mid-infrared lasers is in infrared optical countermeasures (IRCMs), which have become powerful defense tools against IR-guided missiles. A fiber-based IRCM source provides a transformative path to fulfill the needed advancement in efficiency, compactness, robustness and transmission flexibility. It is also frequently desirable for an IRCM laser to have the capability for generating flexible waveforms including the capability to mix and sweep the waveform modulation frequency. A gain-switched fiber laser can fulfill this requirement using a carrier pulse modulation scheme.

Figure 4:
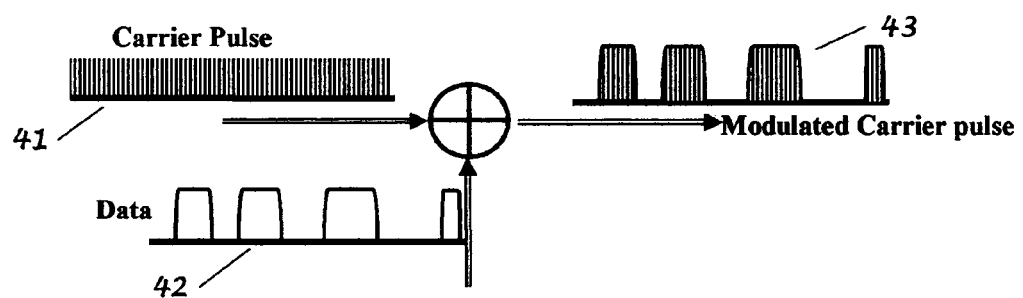
FIG. 4 illustrates a carrier pulse modulation scheme.

Referring to next to FIG. 4, through amplitude modulation, the data waveform 42 is coded as an envelope function on the carrier pulse train 41, resulting in a modulated carrier pulse stream 43. The advantage of this scheme is that the parameters of the carrier pulse and those of the data waveform are decoupled. Using this modulation scheme as the pump pulse to gain-switch the fiber laser, the data waveform is faithfully preserved; hence, this approach can be used to directly encode the information data.

It is to be understood that the present invention is by no means limited to the particular constructions herein disclosed and/or shown in the drawings, but also comprises any modifications or equivalents within the scope of the invention.

What is claimed is:

1. A pulsed, gain switched fiber laser comprising:
   a resonant cavity;
   a thulium doped gain fiber located within the cavity, said thulium doped gain fiber having an emission band which overlaps with an absorption band; and
   a radiation pump source with the output thereof directed into the cavity to pump the thulium doped gain fiber, with the wavelength of the pump source being resonant with the lasing wavelength so that the relaxation from the pump energy level to the lasing energy level is essentially instantaneous and wherein the wavelength, intensity and duration of the pump pulses are selected so that the excitation population generated in the gain fiber by the pump pulses is depleted to a level below the lasing threshold in a time duration less than the relaxation oscillation period of the fiber laser in manner to generate one and only one output laser pulse for each pump pulse and wherein said output laser pulses are stable in amplitude and time.

2. The laser as recited in claim 1, wherein the gain fiber includes a thulium doped core and an outer cladding and wherein the fiber is cladding pumped.

3. The laser as recited in claim 1, wherein the laser is configured to generate pulses as short as 10 nanoseconds.

* * * * *